Feb. 28, 1939.  B. REITER  2,148,581
METHOD OF MANUFACTURING FASTENING MEMBERS FOR SLIDING-CLASP FASTENERS
Filed Nov. 14, 1935  6 Sheets—Sheet 3

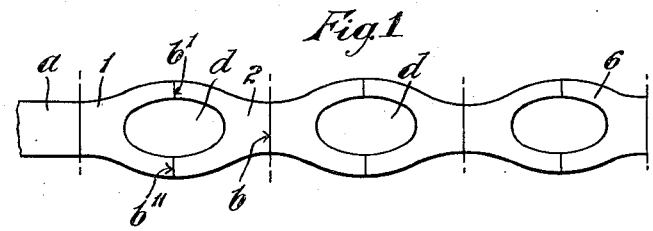
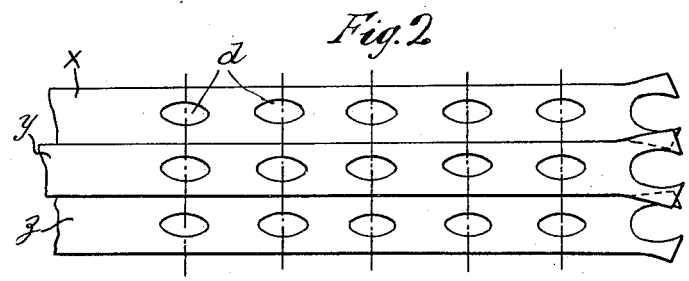
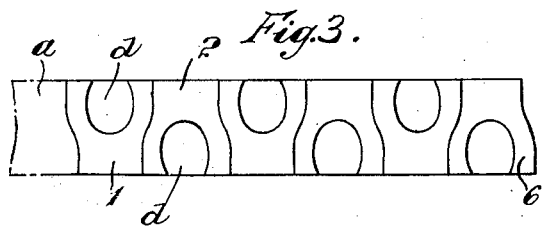
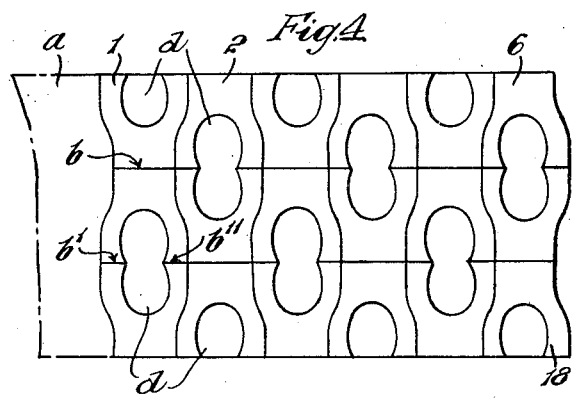

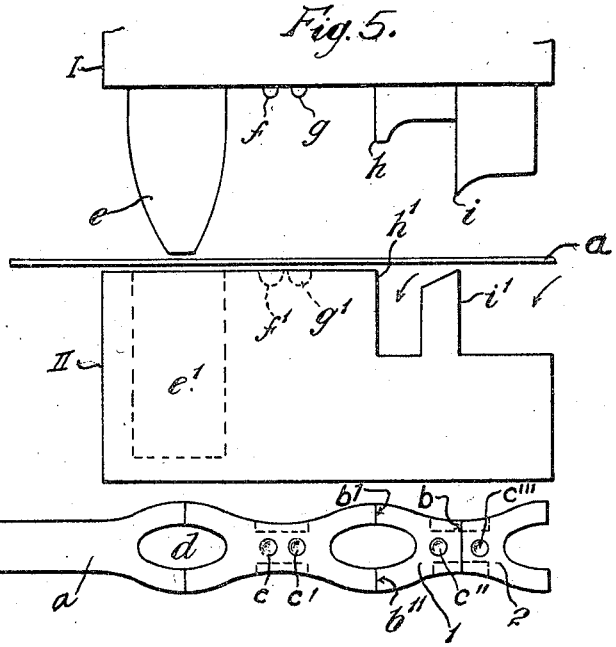
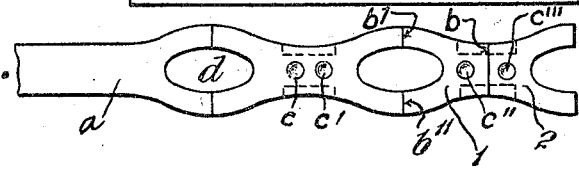
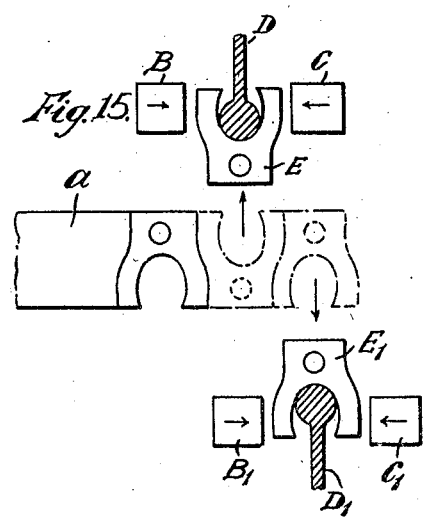

Inventor
BRUNO REITER
by
his Attorney

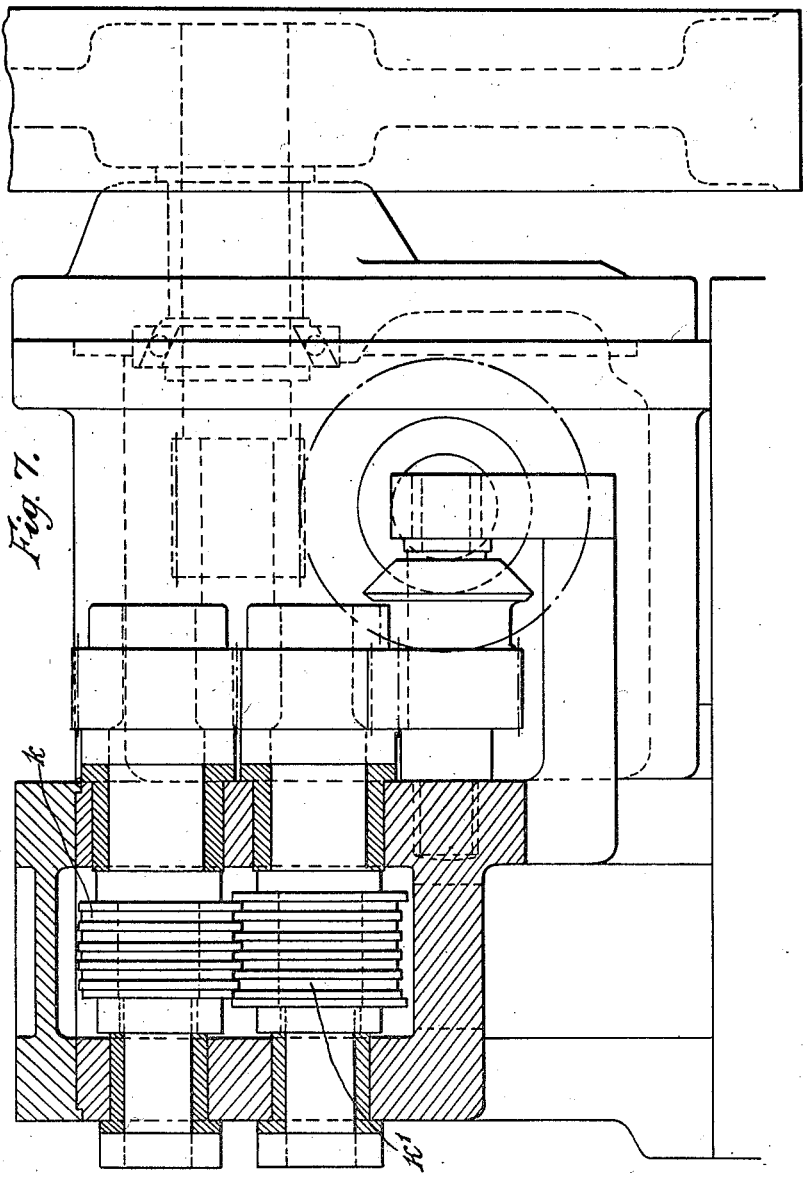

Feb. 28, 1939.  B. REITER  2,148,581
METHOD OF MANUFACTURING FASTENING MEMBERS FOR SLIDING-CLASP FASTENERS
Filed Nov. 14, 1935  6 Sheets-Sheet 5
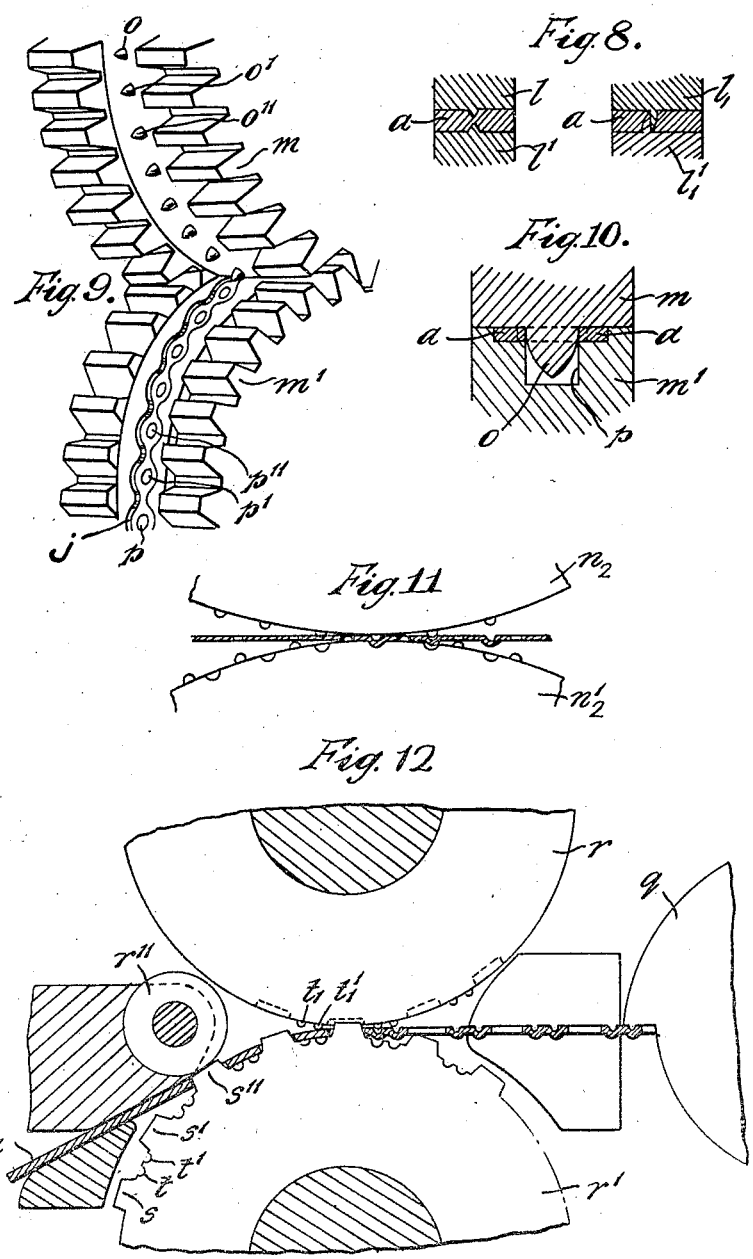
Inventor
BRUNO REITER
by
his Attorney.

Feb. 28, 1939.  B. REITER  2,148,581
METHOD OF MANUFACTURING FASTENING MEMBERS FOR SLIDING-CLASP FASTENERS
Filed Nov. 14, 1935  6 Sheets-Sheet 6
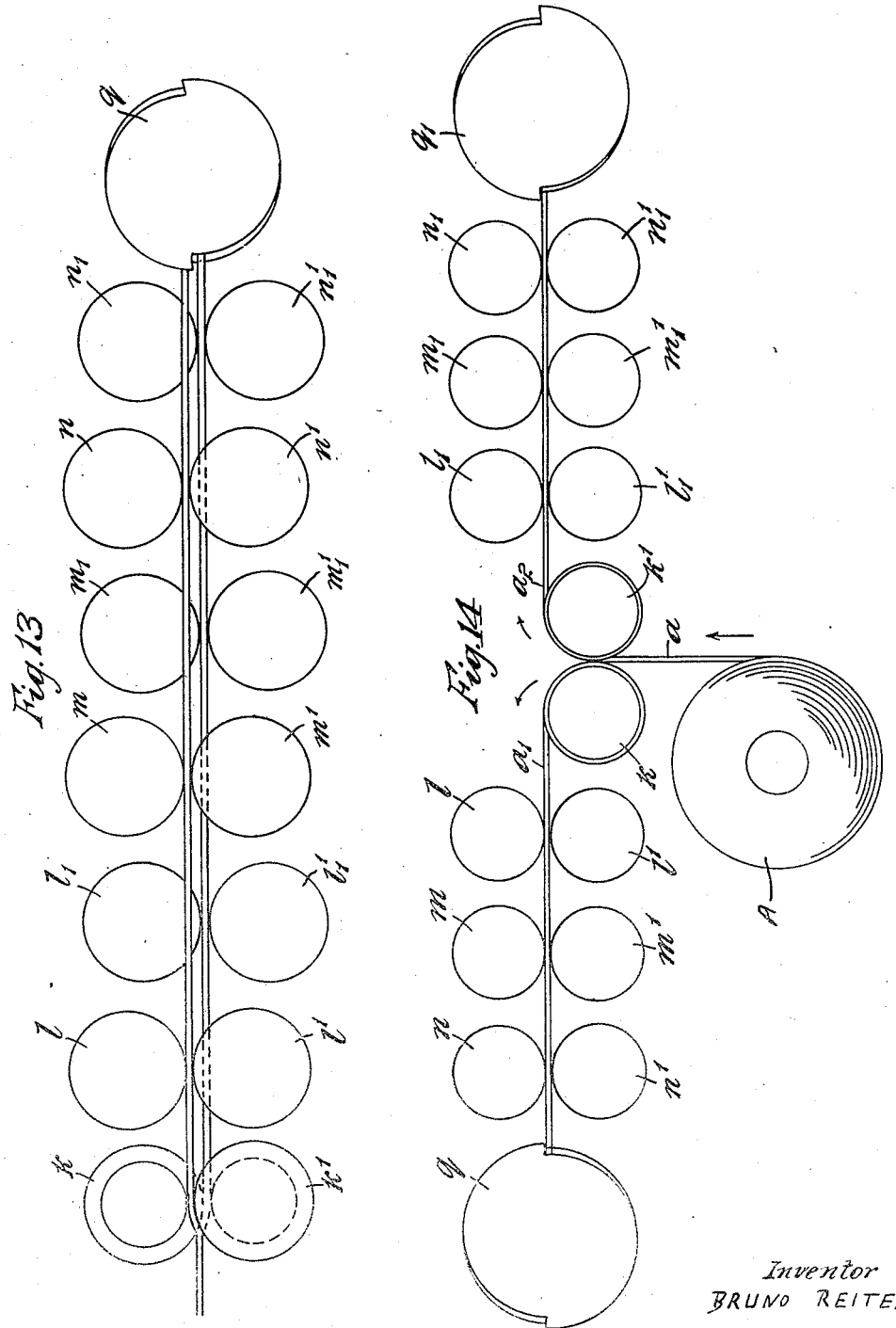
Inventor
BRUNO REITER Patented Feb. 28, 1939

2,148,581

UNITED STATES PATENT OFFICE 2,148,581

METHOD OF MANUFACTURING FASTENING MEMBERS FOR SLIDING-CLASP FASTENERS

Bruno Reiter, Finchley, London, England, assignor to Ingenium Aktiengesellschaft, Chur, Switzerland Application November 14, 1935, Serial No. 49,652
In Germany November 17, 1934

4 Claims. (Cl. 29—148)

This invention relates to a method of manufacturing fastening members for sliding-clasp fasteners.

Hitherto, fastening members with spread prongs, necessary for mounting the members on the supporting tapes have generally been stamped out from a strip of metal. The width of the members being considerably greater across the spread prongs than across the head carrying the interlocking means, a considerable amount of waste occurs between the spread prongs of the members and around their heads. In order to reduce the waste, it has already been proposed to stamp out the members with the prongs closed and to spread the prongs apart in a separate operation before mounting the members on the supporting tape; in this case, some waste still remains between the prongs of the members.

It is an object of the present invention to provide a method of decreasing the waste to a substantial extent as compared with the former known methods, and even to avoid it entirely.

Another object is to combine said method of making fastening members with a method of making sliding-clasp fasteners, which is extremely simple and inexpensive.

Further objects of this invention will be seen from the following specification and claims.

To enable this invention to be more clearly understood, reference will now be made to the accompanying drawings, in which Figs. 1 to 4 illustrate some preferred ways in which metal strip lengths are utilized to form fastener members by the method of the invention.

Figs. 5 and 5a illustrate one manner of forming fastener members by the method of the invention.

Figs. 6 to 12 illustrate a manner of forming fastener members by the method in a rolling process.

Figs. 13 and 14 illustrate the application of the method to the production of a plurality of rows of fastener members.

Figure 6:
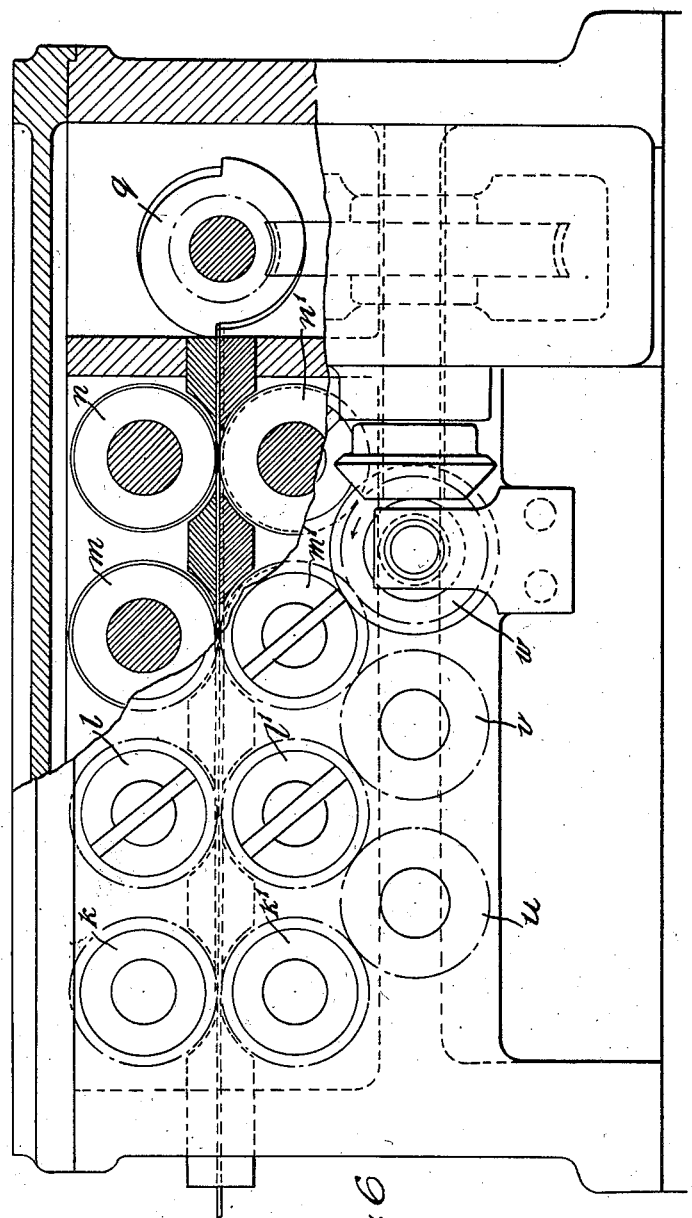

Fig. 15 refers to a method of simultaneously mounting on two tapes the members manufactured in accordance with the invention.

In all the figures similar parts are indicated by the same numerals.

In Fig. 1, $a$ is a metal strip from which fastening members are formed at the places 1, 2, ... 6. The heads and the prongs of the members point alternately in opposite directions and the members are made to face one another in pairs in the longitudinal direction of the strip. Also, the members are arranged in one row only. The strip $a$ is initially narrower than the width of the finished members across their spread prongs; as illustrated, the initial width of the strip is that of the finished members across their heads. Thus, wastage of material around the heads is avoided.

In order to avoid waste of material between the prongs and at the same time to provide the necessary spreading thereof, the parts $d$ of the strip enclosed by the prongs are not punched out from the strip and thus wasted, but the prongs are formed by pressing the metal at the parts $d$ sideways and compressing it, so that the strip assumes a wave-like contour at its longitudinal edges, as shown in Fig. 1. In this way, the metal which would be lost by punching out the parts $d$ is usefully employed for building up the members. Furthermore, by deforming the metal in this way, not only is it broadened at the deformed parts, thereby enabling a narrower strip to be used, as mentioned above, but the density of the metal forming the prongs is increased by the compression, thus enabling an initially lighter strip to be used than would otherwise be necessary for making the members according to prior methods. The new method therefore effects substantial economies in material.

If several contiguous rows of fastening members, arranged according to Fig. 1, should be manufactured at the same time the metal cannot spread laterally since the contiguous rows would then interfere with one another. This difficulty, however, can be overcome, as more fully explained further below in connection with Fig. 2.

This difficulty does not arise with the alternative arrangement shown in Figs. 3 and 4 wherein the members lie side by side across the strip $a$ and not longitudinally as in Fig. 1. In this case, deformation and spreading of the strip, on pressing the metal parts $d$ sideways, takes place longitudinally of the strip and not transversely as in Fig. 1, and therefore involves only lengthening of the strip to a slight extent. Thus, several contiguous rows of fastening members can be fabricated simultaneously without difficulty from one metal strip, as illustrated by Fig. 4 which shows a strip $a$ from which are formed three rows of fastening members at the places 1, 2, ... 18. As shown, to avoid waste of material, the members in one row may be displaced relatively to the members in an adjacent row by the length of a member.

If the members are arranged as illustrated in Figs. 1 and 4, several members can easily be manufactured simultaneously and separated from one another along the lines $b, b', b''$, etc. Moreover, the separation of the members may be effected simultaneously in the cutting operation, so that a separate operation is not necessary for this purpose.

Referring now to Fig. 2, the fastening members are at first manufactured with closed prongs. In this case, the width of the members is approximately the same over their entire length, and all the members face in the same direction longitudinally of the strip, the head of one member abutting against the ends of the prongs of the next member. Again, the material between the prongs is not stamped away but this material is pressed sideways and compressed in accordance with the invention. In a following step the closed prongs are spread laterally.

The following difficulty, however, arises. If several rows of fastening members are arranged contiguously, the prongs cannot spread laterally, since the contiguous rows would then interfere with one another, as soon as the prongs are spread, for instance, in the last operation. This difficulty is similar to that mentioned above in connection with Fig. 1. In both cases, it can be overcome by dividing, e. g. by cutting, a strip of metal, in a preceding operation, into a plurality of individual strips $x, y, z$, the width of each of which substantially corresponds to the width necessary for making only one row of fastening members, and displacing the separate strips in level by at least the initial thickness of the metal, or separating them in some other manner from one another.

The use of a strip, the width of which corresponds substantially to the width of several fastening members arranged in juxtaposition, and which is subsequently divided, is preferable to the use of a single narrow strip, because a wider strip is comparatively cheaper than several individual narrow strips.

Fig. 5 shows a device for manufacturing members according to Fig. 1. Several rows of the tools (hereinafter described) may be provided according to the number of strips into which the main strip is divided. I is the counter-die and II the corresponding matrix in section, while Fig. 5a is a plan view of the metal strip $a$ which passes through the device. The tool $e$, which is preferably rounded off in the form of a truncated cone, pierces and, in co-operation with the matrix $e'$, squeezes the material of the strip $a$ apart, so that the opening $d$ enclosed by two pairs of prongs is produced, the material spreading laterally. This piercing and squeezing operation may be preceded by preliminary indentation not shown in the figure. Suitably constructed tools, $f, g$ and $f', g'$ impress in the metal strip coupling devices $c, c'$, comprising projections and depressions. These devices are in close proximity to one another. The tool $h$ coacting with the edge $h'$ cuts the members along the lines $b', b''$, while the tool $i$ co-acting with the edge $i'$ separates the members along the line $b$. The tool $i$ may, for instance, be curved away in order to avoid damaging the coupling elements $c'', c'''$, and the punch $h$ may have suitable recesses. The finished members 1 and 2 fall in the direction of the arrows into receivers or the like. On the return of the die, the strip is advanced by the length of two members.

Instead of employing rising and falling tools, the members may be manufactured in a rolling process, by passing the strip of material or the divided parts thereof under a number of rollers continuously. Each roller is provided with a plurality of tools corresponding to the different tools $e, f, g, h, i$, and $e', f', g', h', i'$ respectively as shown in Fig. 5. Owing to the uniform and continuous feeding, a multiple of the number of members which was hitherto obtainable can thus be manufactured per unit time.

An embodiment of a machine employing roller tools is illustrated in Figs. 6 and 7 in side and end elevations respectively, each partly in section. The machine consists essentially of four different kinds of rollers $k, k', l, l', m, m', n, n'$, provided in pairs arranged in series and also a rotating cutting tool $q$. The pairs of rollers are driven by the wheels $u, v, w$, which in turn are operated by a common driving device. The rollers $k, k'$ serve to divide a wide metal strip into several independent strips like $x, y, z$ (Fig. 2) and to separate them at different levels. These rollers are only required when such sub-division is necessary and may be omitted or replaced by simple feed rollers in other cases, for example, when making fastener members according to the arrangements of Figs. 1, 3 and 4.

The pair of rollers $l, l'$ serve for indenting the metal strip at the parts $d$ in Figs. 1–4, preparatory to the piercing and deforming operation which is performed by the rollers $m, m'$. The rollers $n, n'$ impress the coupling devices in the strip and the cutter $q$ severs the finished members. Each roller is provided at its circumference with a number of identical tools which cooperate with the tools of the counter-roller in each case. The tools with which the various rollers are provided will naturally be determined by which of the specific methods described with reference to Figs. 1–4 is adopted.

As an illustration, the manufacture of members according to Figs. 1 and 5a will be considered.

Fig. 8 shows a section through a pair of rollers $l, l'$. It is seen that the tools of the rollers $l, l'$ are of approximately identical construction and perform the function of indenting the strip of metal $a$ at the points where the holes are subsequently provided between the prongs by the pairs of rollers $m, m'$ already described.

$l_1$ and $l_1'$ show a somewhat modified form of construction of a pair of rollers for the purpose of indenting the strip of material, the mode of operation of which is clearly apparent from Fig. 8.

After indentation, the strip passes to the piercing rollers $m, m'$ illustrated in enlarged perspective view in Fig. 9. Fig. 10 shows a section through the rollers $m, m'$, at the point where a punch $o$ has fully entered the matrix $p$ and pierced the strip $a$. The upper roller has a row of piercing tools $o, o', o''$, which co-operate with corresponding matrices $p, p', p''$, in the lower roller. The strips are thereby pierced, the material which is pressed sideways being confined and compressed in the mould $j$, so that the strip after running through a pair of rollers $m, m'$, has approximately the form of the strip illustrated in Fig. 1.

The strip then passes to the rollers $n, n'$ which impress the coupling members (like $c, c'$, Fig. 5a), the rollers having suitable tools for the purpose, similar as is illustrated by $t, t_1$ and $t', t_1'$ in Fig. 12. The strip then passes to the cutter $q$ which severs the fastening members at $b, b', b''$ (Fig. 1).

Obviously, the various tools will be modified according to which of the specific methods illustrated by Figs. 1 to 4 will be used. As regards the rollers $m, m'$ the spikes $o$, matrix $p$ and mould $j$ will have to be modified correspondingly. As an example of such modification, Fig. 11 illustrates rollers $n_2$, $n_2'$ (corresponding to the rollers $n$, $n'$ of Fig. 6) arranged for operating on a strip where the head end of each member adjoins the prongs of the next succeeding member.

The cutting tools $q$ serve to cut off the finished fastening members. Their mode of operation is clearly apparent from Figs. 6 and 12. If the arrangement of members is chosen in accordance with Fig. 1 in which the prongs are already spread apart by the rollers $m$ and $m'$, the work of the tool $q$ merely consists in cutting off each individual member as will be seen from Fig. 12. In the alternative arrangement as shown in Fig. 2, in which the prongs are not spread by the rollers $m$, $m'$, the tool $q$ has also to perform the spreading of the prongs. To do this, the tool $q$ (see Fig. 6) is wedge-shaped as shown such that the prongs of the continuously advancing member are gradually spread apart by the wedge as the tool $q$ rotates until the cutting edge of the tool $q$ approaches the member and cuts off the member at its head end.

The device works, for instance, in the following manner. A wide strip of metal passes between the pairs of rollers $k$, $k'$, which divide it into a number of parts. At the same time the separate parts are displaced in level relative to each other. The separated strips now pass under the rollers $l$, $l'$ and are indented at intervals which correspond to the length of one or two fastening members as the case may be. They then come between the pairs of rollers $m$, $m'$, in which they are pierced at the indented points, without, however, any waste occurring, the material merely being pressed apart sideways and thus compressed. Between the succeeding pairs of rollers $n$, $n'$, the projections and depressions of the coupling device are impressed, while, finally, the tools $q$ spread the prongs of the members if they are not already spread by the rollers $m$, $m'$, and cut off the finished members from the strips. The rollers $k$, $k'$, $l$, $l'$, $m$, $m'$, $n$, $n'$ rotate at the same speed and have the same number of tools on their circumference, while the cutting tools $q$ have only two cutting-off devices and, if necessary, spreading devices, and, therefore, have to rotate at a higher speed.

In the device according to Fig. 12, which is now more fully described, the pairs of rollers $m$, $m'$ and $n$, $n'$ described above are replaced by a single pair of rollers $r$, $r'$, and an auxiliary roller $r''$. In the embodiment shown, it is assumed that the fastening members are arranged, as in Fig. 1, i. e. the head and prong ends of the fastening members point alternatively in opposite directions and abut against one another alternately. The strip of metal $a$ is introduced into the device obliquely. The roller $r'$ has projections $s$, $s'$, $s''$ which cooperate with the roller $r''$ to pierce the strip at the points $d$ (see Fig. 1) and press the material sideways. At the same time the roller $r'$ is provided with the matrices $t$, $t'$ between each pair of projections $s$, $s'$, $s''$, which matrices co-operate with the counter-dies $t_1$, $t_1'$ on the roller $r$ to impress the coupling projections and depressions. After leaving the pairs of rollers $r$, $r'$, the members, which have been prepared with spread prongs are cut off by the cutter $q$. Again, the members may be manufactured in several rows from a plurality of strips divided from a single main strip.

A certain difficulty arises in connection with the feeding forward of such strips, owing to the fact that these are situated at different levels. One way of overcoming this difficulty is to have all rollers of one kind driven by a common shaft and to make the upper and lower rollers of different diameters. Theoretically, the different circumferential velocities of the upper and lower rollers associated therewith appear to be unfavourable for the feeding of the metal strips. As tests have shown, however, the effect on the advancement of the material is so small that no noticeable disadvantages arise.

Another possible method of overcoming this difficulty is illustrated in Fig. 13. In this arrangement, all the rollers have the same diameter and thus the same circumference. It is, however, no longer possible in this case to mount all the rollers of the same kind on a common shaft. Only those rollers which treat strips on the same level are driven by one shaft therefore. In Fig. 13, $k$, $k'$ denote the rollers which serve for cutting off the strips and which are constructed in a similar manner as the corresponding rollers in Fig. 7. The strips of material are alternately brought by these rollers to two different levels. The strips of material situated at the higher level are treated by several pairs of rollers $l$, $l'$, $m$, $m'$, $n$, $n'$ arranged in series. The mode of operation of these pairs of rollers is the same as that of the corresponding pairs of rollers in Fig. 6. For treating the strips of material situated at the lower level, pairs of rollers $l_1$, $l_1'$, $m_1$, $m_1'$, $n_1$, $n_1'$ are provided. The pairs of rollers for the different levels are displaced relatively to one another in such a manner that the pairs of rollers provided for the same level can be driven by a common shaft. The members are ultimately severed from the metal strips by tools as in the device previously described. In this type of arrangement also, all modifications mentioned in the description of the device according to Figs. 6 to 12 may be provided. Still another possible method of overcoming the abovementioned difficulty is to guide the individual strips not at different levels in the same direction, but in entirely different directions. Fig. 14 shows an embodiment of such a device. The strip $a$ unwinds from a drum A and is divided by the pair of rollers $k$, $k'$ into a plurality of individual strips, which are alternately guided to the left and right. The strips $a_1$ which are guided to the left are treated by the pairs of rollers $l$, $l'$, $m$, $m'$, $n$, $n'$ and the cutting tool $q$, while the strips $a_2$, which are guided to the right are treated by the pairs of rollers $l_1$, $l_1'$, $m_1$, $m_1'$, $n_1$, $n_1'$ and the cutting tool $q_1$.

The arrangement of the fastening members in accordance with Figs. 3 and 4 is particularly advantageous if the device for making the members is combined with a device for applying the members to tapes.

By making members, every two of which are displaced through an angle of 180° relatively to one another, it is possible to supply two tapes simultaneously, and to press the members onto the tapes to form stringers, in such a manner that the members on the two tapes face one another so that the stringers may immediately be fed to a sliding-member and closed by it, so that by this arrangement, it is immediately possible to combine mechanically two stringers to form a complete fastener.

Fig. 15 shows an embodiment applicable to the arrangement of the members on the metal strip in accordance with Fig. 3, $a$ is the metal strip from which the members E and E' are made and applied to two tapes D, D', by means of dies or the like. They are pressed on to the tapes by means of presses B, C and B₁, C₁ respectively.

The embodiments and arrangements illustrated in the drawings are only intended to clarify my invention, but it should be clearly understood that many variations are possible without departing from the scope of my invention. For example, instead of arranging the members in three rows, the members may be arranged in any suitable number of rows.

Again, although by means of my invention substantial waste of metal is avoided in forming the prongs themselves, some waste of metal will occur if a distance space is provided between the members of the rows or between several rows.

I claim:

1. In a method of making interlocking members for sliding-clasp fasteners comprising interlocking means and prongs for clamping said members on a supporting member from a strip of metal, forming the prongs by piercing and pressing sideways the metal of said strip at predetermined intervals along the strip to form holes therein and simultaneously compressing the metal around said holes.

2. In a method of making interlocking members for sliding-clasp fasteners comprising interlocking means and prongs for clamping said members on a supporting member from a strip of metal, forming the prongs continuously in a rolling process by piercing and pressing sideways the metal of said strip at predetermined intervals along the strip to form holes therein and simultaneously compressing the metal around said holes.

3. In a method of making interlocking members for sliding-clasp fasteners comprising interlocking means and prongs for clamping said members on a supporting member from a strip of metal, forming the prongs by piercing and pressing sideways the metal of said strip at predetermined intervals along the strip to form holes and simultaneously compressing the metal around said holes, and forming said members on said strip so that each member is positionally reversed with respect to the next.

4. In a method of making interlocking members for sliding-clasp fasteners comprising interlocking means and prongs for clamping said members on a supporting member from a strip of metal, forming the prongs by piercing and pressing sideways the metal of said strip at predetermined intervals along the strip to form holes and simultaneously compressing the metal around said holes, and forming said members so that the head end of one member adjoins the head end of the next member and the prongs of said next member adjoin the prongs of the following member.

BRUNO REITER.